R. SIEGFRIED.
BEARING.
APPLICATION FILED MAR. 20, 1912.
1,204,505.
Patented Nov. 14, 1916.
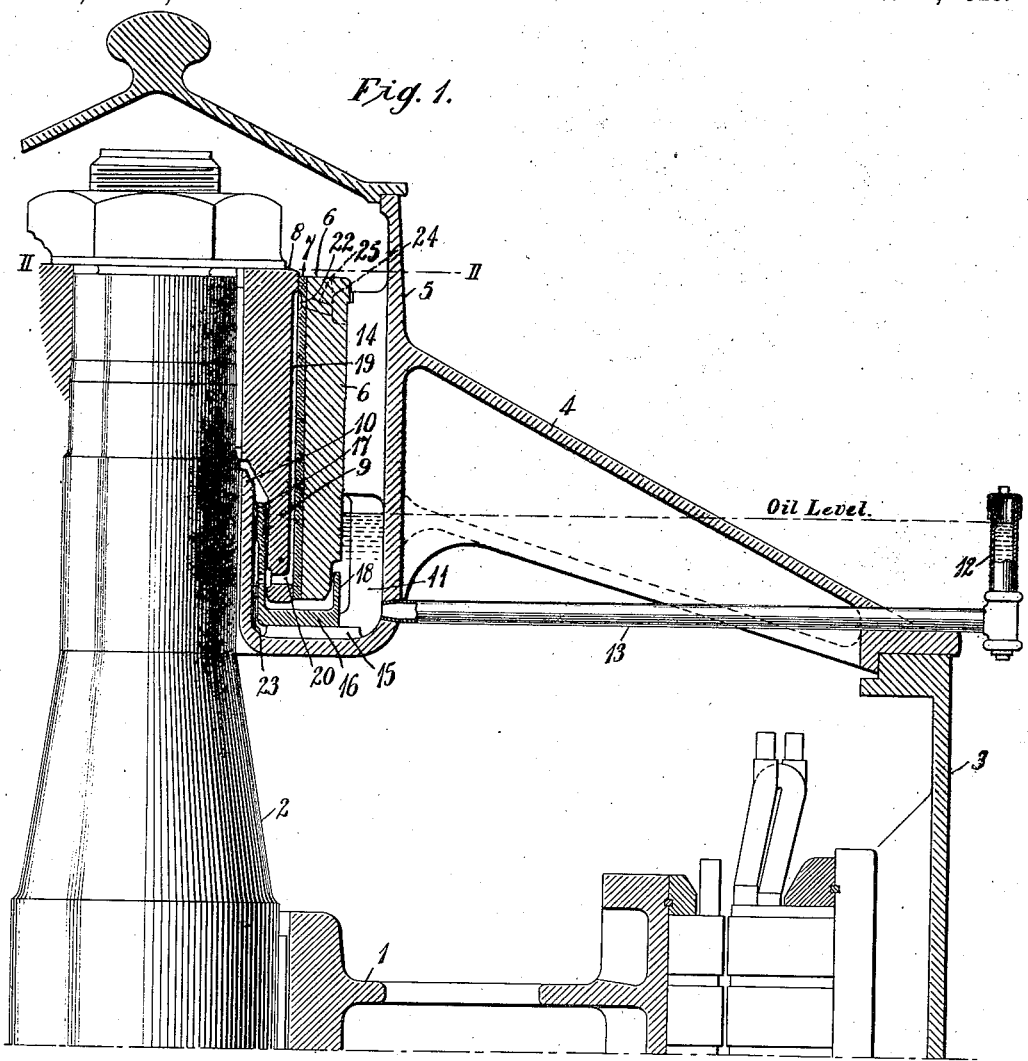
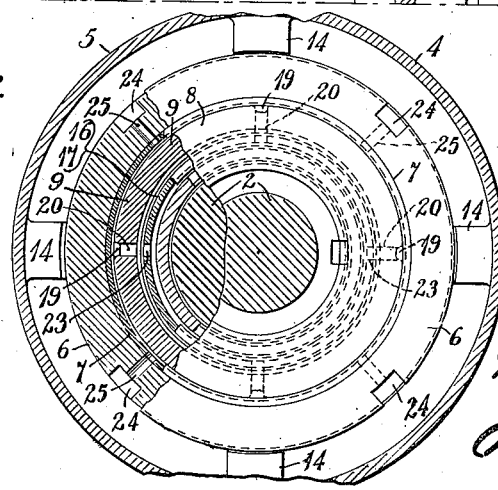

UNITED STATES PATENT OFFICE.

ROBERT SIEGFRIED, OF PITTSBURGH, PENNSYLVANIA, ASSIGNOR TO WESTINGHOUSE ELECTRIC AND MANUFACTURING COMPANY, A CORPORATION OF PENNSYLVANIA.

BEARING.

1,204,505.  Specification of Letters Patent.  Patented Nov. 14, 1916.

Application filed March 20, 1912. Serial No. 685,060.

*To all whom it may concern:*

Be it known that I, ROBERT SIEGFRIED, a citizen of the United States, and a resident of Pittsburgh, in the county of Allegheny and State of Pennsylvania, have invented a new and useful Improvement in Bearings, of which the following is a specification.

My invention relates to shaft bearings, and it has special reference to guide bearings for vertical shaft machines.

One object of my invention is to provide an automatically lubricated bearing, of the class above indicated, that shall be relatively simple and durable in construction and particularly adapted for use with relatively high-speed vertical-shaft machines.

Another object of my invention is to provide means for effectively lubricating guide bearings for vertical-shaft machines and for preventing the churning or bubbling of the lubricating fluid.

The coöperating parts of shaft bearings have, in many instances, been partially or wholly immersed in oil and I am aware that that it is broadly old to automatically supply oil to the bearing surfaces by the centrifugal action of the moving parts. However, considerable difficulty has hitherto been encountered in attempting to embody these features in bearings for relatively high-speed machines, on account of the churning and bubbling of the oil which took place during the operation of such machines.

According to my present invention, I provide a guide bearing which embodies means for automatically supplying oil to its coöperating bearing surfaces and is structurally adapted to overcome the above-named difficulties.

Figure 1 of the accompanying drawings is a sectional elevation of a portion of a dynamo-electric machine embodying the guide bearing of my invention. Fig. 2 is a sectional plan view, on the line II—II of Fig. 1.

Referring to the drawings, a rotatable member 1 of a dynamo-electric machine is provided with a vertical shaft 2 and coöperates with a stationary member 3 having a top bracket 4.

A substantially cylindrical bearing housing 5 is integral with the top bracket 4 and supports a stationary bearing sleeve 6. The sleeve 6 has a Babbitt or other soft metal lining 7 and coöperates with a cylindrical bearing member 8, which is secured to the upper end of the shaft 2 and is fitted into the sleeve 6.

The cylindrical member 8 is counterbored at its lower end to provide an annular projection 9, which overhangs an annular projection or flange 10 of the housing 5.

The space between the body of the housing and the projection or flange 10 constitutes an annular oil well or pocket 11, into which the lower ends of the bearing members 6 and 8 extend. Oil, or other lubricating fluid is supplied to the annular oil well from an oil cup 12, which is located outside of the frame of the machine and is connected to the bottom of the well by a pipe 13.

The cylindrical housing 5 is considerably larger in diameter than the sleeve 6 and is provided with a plurality of radial ribs 14 on which the sleeve is supported. Since the supporting ribs are considerably shorter than the sleeve, the lower end of the latter projects into an unobstructed oil space. The bottom of the oil well is provided with a plurality of ribs or projections 15 on which an annular baffle member 16 of L-shaped section, is supported, as shown in Fig. 1.

The inner wall 17 of the baffle member extends between the flange 10 of the housing and the annular projection 9 of the bearing member 8, and is so proportioned as to clear the rotatable bearing member. A projection or flange 18 of the baffle member overlaps the lower end of the stationary sleeve 6, the arrangement of parts being such that the lower ends of the bearing members 6 and 8 extend into the trough of the baffle member without touching its walls.

The outer surface of the bearing member 8 is provided with a plurality of longitudinal grooves 19, which communicate, at their lower ends, with radial holes or passages 20 in the projection 9. The grooves 19 terminate, near the upper end of the bearing member, opposite a groove 22 in the inner surface of the sleeve 6.

The wall 17 of the annular baffle member 16 is provided with a plurality of radial holes 23 which are substantially in the plane of the holes or passages 20 of the bearing member 8.

The sleeve 6 is provided with notches 24 and passages 25 which constitute outlets for the grooves 22.

Oil is maintained at a predetermined level in the well 11 by keeping the oil cup 12 filled to a corresponding level.

When the shaft and the bearing member 8 are rotating, centrifugal action forces the oil in the passages 20 outward into the grooves 19 thereby creating sufficient fluid pressure therein to force the oil upwardly into the annular grooves 22. From this groove, it flows through the passages 25 and into the oil well 11. The oil which is forced out of the passage 20 is, of course, immediately replaced by oil from the oil well which is supplied through the radial holes 23 in the baffle member 16.

The baffle member is especially important since it reduces the quantity of oil in which the lower end of the bearing member 8 is rotating, without limiting the capacity of the oil well.

The dynamo-electric machine, a portion of which is illustrated, forms no part of my present invention, and the bearing may, of course, be utilized with machines or devices of any character having substantially vertical shafts.

I have used the term "oil" to indicate any suitable lubricating fluid.

The longitudinal grooves 19 may be omitted and corresponding grooves located in the stationary sleeve 6, but I prefer to make the grooves in the bearing member which is subject to least wear.

It is evident that other structural modifications may be effected within the spirit and scope of my invention.

I claim as my invention:

1. In a shaft bearing, the combination with a vertical shaft and an annular oil well surrounding the shaft, of a pair of concentric cylindrical bearing members extending downwardly into the annular oil well, one of said members being secured to the shaft, radially perforated to feed oil from the well to the bearing surface and provided with longitudinal grooves communicating with the radial perforations.

2. In a shaft bearing, the combination with a vertical shaft and an annular oil well surrounding the shaft, of a pair of concentric cylindrical bearing members extending downwardly into the annular oil well, one of said members being secured to the shaft, radially perforated to feed oil from the well to the bearing surface and provided with longitudinal grooves communicating with the radial perforations and the other of said members being radially perforated to provide passages communicating with the said longitudinal grooves above the oil well.

3. In a shaft bearing, the combination with a vertical shaft, a stationary annular oil well surrounding the shaft, a stationary hollow cylindrical bearing member surrounding the shaft and extending into the oil well, a longitudinally grooved bearing member fitted into the stationary bearing member secured to the shaft and having an annular projection which extends into the oil well.

4. In a shaft bearing, the combination with a vertical shaft, a stationary annular oil well surrounding the shaft, a stationary hollow cylindrical bearing member surrounding the shaft and extending into the oil well, a longitudinally grooved bearing member secured to the shaft within the stationary bearing member and having an annular projection which extends into the oil well and is provided with radial passages to conduct oil from the well outward through the passages to the longitudinal grooves in the bearing member.

5. In a shaft bearing, the combination with a vertical shaft and an oil-containing receptacle provided with ribs on its inner surface, of a stationary bearing member supported by part of said ribs, a bearing member secured to said shaft, and a baffle member supported by another part of said ribs and inclosing a portion of said bearing members.

6. A shaft bearing comprising an oil well, a rotatable member provided with radial perforations extending into the oil well, a stationary hollow cylindrical member surrounding and coöperating with the rotatable member and means for preventing churning or bubbling of the oil in the oil well adjacent to the said perforations.

7. A bearing comprising coöperating stationary and movable bearing members, an oil-containing receptacle into which the members extend and a baffle member for confining the oil adjacent to the members.

8. A bearing comprising an oil-containing receptacle, coöperating bearing members partially located therein and means surrounding said bearing members for preventing churning or bubbling of the oil in the receptacle adjacent to the said bearing members.

9. A bearing comprising an annular oil receptacle, a perforated annular trough shaped baffle member therein and coöperating bearing members extending into the baffle member.

10. A shaft bearing comprising an oil well, a radially perforated rotatable member extending into the oil well, a stationary hollow cylindrical member surrounding and coöperating with the rotatable member and a perforated annular trough-shaped baffle member located in the oil well and into which the ends of the bearing members extend.

11. In a shaft bearing, the combination with a vertical shaft, an oil well and an annular trough-shaped baffle member surrounding the shaft in the well, of a pair of concentric cylindrical bearing members extending downwardly into the annular baffle member, one of said members being secured to the shaft and embodying means for feeding oil to the bearing surfaces.

12. In a bearing, the combination with a vertical shaft, an annular oil well surrounding the shaft, and an annular trough-shaped baffle member in the well, of a pair of cylindrical bearing members, one of which is secured to the shaft, extending into the annular baffle member, the bearing member secured to the shaft being radially perforated within the baffle member and provided with longitudinal slots in its bearing surface which communicate with the radial perforations.

13. In a bearing, the combination with a vertical shaft, an annular oil well surrounding said shaft, and an annular trough-shaped baffle member in the well and having radial perforations, of a pair of cylindrical bearing members, one of which is secured to the shaft and extends into the baffle member, the bearing member secured to the shaft being radially perforated within the baffle member and provided with longitudinal slots in its bearing surface which communicate with the radial perforations in said bearing member.

In testimony whereof I have hereunto subscribed my name this 1st day of March, 1912.

ROBERT SIEGFRIED.

Witnesses:
B. B. HINES,
M. CLARA MERZ.